(12) United States Patent
Parrinello

(10) Patent No.: US 8,128,250 B2
(45) Date of Patent: Mar. 6, 2012

(54) ARTICULATING DRILL WITH ILLUMINATION

(75) Inventor: Jon Parrinello, Elgin, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/701,783

(22) Filed: Feb. 8, 2010

(65) Prior Publication Data

US 2011/0170312 A1    Jul. 14, 2011

Related U.S. Application Data

(60) Provisional application No. 61/294,059, filed on Jan. 11, 2010.

(51) Int. Cl.
*B25B 23/18* (2006.01)

(52) U.S. Cl. ......... 362/119; 362/109; 362/253; 362/317

(58) Field of Classification Search .................. 362/109, 362/119–120, 253, 257, 296.01, 317, 341
See application file for complete search history.

(56) References Cited

U.S. PATENT DOCUMENTS

| | | |
|---|---|---|
| 5,954,458 A | 9/1999 | Lee |
| 6,550,952 B1 | 4/2003 | Hulse et al. |
| RE38,729 E | 4/2005 | Liu |
| 6,890,135 B2 | 5/2005 | Kopras et al. |
| 6,939,022 B2 | 9/2005 | Brooks |
| 7,055,622 B2 | 6/2006 | Bone |
| 7,137,761 B2 | 11/2006 | Hara et al. |
| 7,156,187 B1 | 1/2007 | Townsan |
| 7,331,685 B2 | 2/2008 | Shen et al. |
| 7,404,696 B2 | 7/2008 | Campbell |
| 2002/0131267 A1* | 9/2002 | Van Osenbruggen ........ 362/109 |
| 2006/0104085 A1* | 5/2006 | Walker et al. ................. 362/578 |
| 2008/0289843 A1* | 11/2008 | Townsan ........................ 173/216 |

* cited by examiner

*Primary Examiner* — Stephen F Husar
*Assistant Examiner* — Meghan Dunwiddie
(74) *Attorney, Agent, or Firm* — Maginot, Moore & Beck

(57) ABSTRACT

The present invention is an articulating hand power tool which in one embodiment includes a head portion including a head housing configured to articulate with a main housing, a bit holder rotatably positioned within the head housing, and a lighting assembly configured to emit a first elongated beam pattern from the head portion.

19 Claims, 9 Drawing Sheets

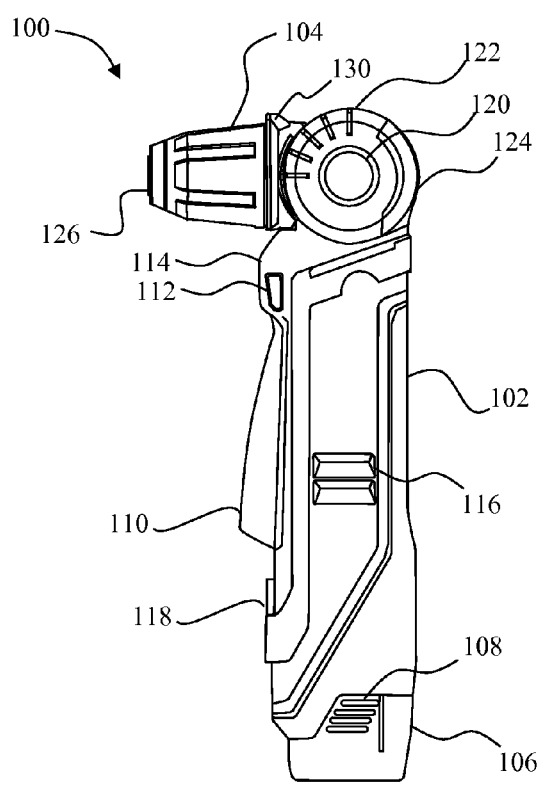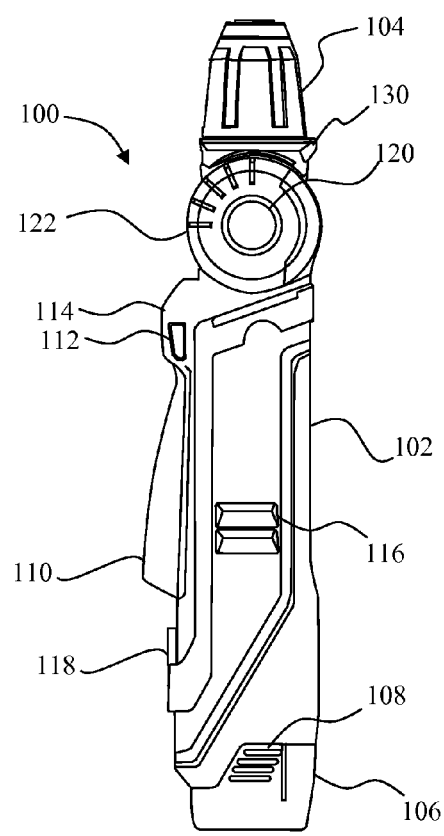
FIG. 1
FIG. 2

ARTICULATING DRILL WITH ILLUMINATION

This application claims the benefit of U.S. Provisional Application No. 61/294,059, filed Jan. 11, 2010.

FIELD OF THE INVENTION

The present invention relates to an electric hand tool and more particularly to an articulating power hand tool.

BACKGROUND

Electric drills are usually constructed as straight-drilling machines in which the drill spindle extends parallel to the motor shaft and axis of the housing and, for specific purposes, as angular-drilling machines in which the drill spindle is aligned at a right angle to the motor shaft and housing axis. In certain applications in which both straight and angular drilling must be carried out, as is the case in installations in wooden house construction, the two machines must be at hand for continuous alternation.

In order to reduce the number of tools needed at a work site, articulating drills have been developed. One such articulating drill is disclosed in U.S. application Ser. No. 11/593,187, filed on Nov. 3, 2006. The tool disclosed in the '187 application includes a head portion including a head housing, a bit holder rotatably positioned within the head housing, and a bearing member operable to transfer a first axial force from the bit holder to the head housing. A frame is rotatably connected to the head portion for placement in a plurality of positions with respect to the head portion and operably connected to the head housing for receiving the first axial force transferred to the head housing. The tool further includes an articulating gear system for transferring rotational force generated by a motor to the bit holder at each of the plurality of positions.

The tool disclosed in the '187 application thus provides a single tool which provides both straight and angular drilling or other shaping operations. During operation of the tool disclosed in the '187 application, as well as operation of other power tools, precise control of the hand-held power tool requires that the user of the tool have good visibility of the work piece at the point of the shaping operation. Lack of sufficient lighting is frequently caused by generally poorly lighted construction environments. Even in areas of generally good lighting, the operator of the tool and the tool itself cast a shadow over the work piece. Visibility can also be reduced by a build-up of cutting debris (e.g., sawdust).

Various alternatives are available to improve visibility such as by removal of debris formed by the shaping operation. Some power tools employ vacuum systems connected to the tool to remove cutting debris. The use of a vacuum system, however, often makes control of the tool more cumbersome. Moreover, even if the shaping operation debris is removed, the potential remains for insufficient lighting at the point of a shaping operation solely from lack of proper lighting. The potential for poor lighting is increased by the ability to use tools such as the tool disclosed in the '187 application in confined work areas.

Some attempts to ameliorate poor lighting conditions at the point of a shaping operation have included the addition of one or more light emitting diodes (LED) near the bit holder of a tool. The use of point light emitters is effective in applications with little if any debris so long as an appropriate sight line to the point of the shaping operation is available. In applications with greater levels of debris, and application where there are limited sight lines available such as in confined work areas, point light emitters are easily obfuscated.

Accordingly, there is a need for a hand-held power tool that allows increased illumination at the point of a shaping operation. A power tool that allows increased illumination at the point of a shaping operation with an articulating power hand tool with a reduced forward section and a compact articulating system is also needed.

SUMMARY

The present invention in one embodiment is an articulating hand power tool which includes a head portion including a head housing configured to articulate with a main housing, a bit holder rotatably positioned within the head housing, and a lighting assembly configured to emit a first elongated beam pattern from the head portion.

In a further embodiment, an articulating hand power tool includes a main housing, a head portion configured to articulate with a main housing, a bit holder rotatably supported within the head portion, a first lighting structure positioned on the head portion, and a lighting assembly configured to emit an elongated beam pattern from the first lighting structure.

These and other advantages and features of the present invention may be discerned from reviewing the accompanying drawings and the detailed description of a preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 1 depicts a side plan view of an articulating drill incorporating features of the present invention with a head portion positioned at a ninety degree angle with respect to a main housing portion;

FIG. 2 depicts a side plan view of the articulating drill of FIG. 1 with the head portion aligned with the main housing portion;

DESCRIPTION

Figures 3, 4:
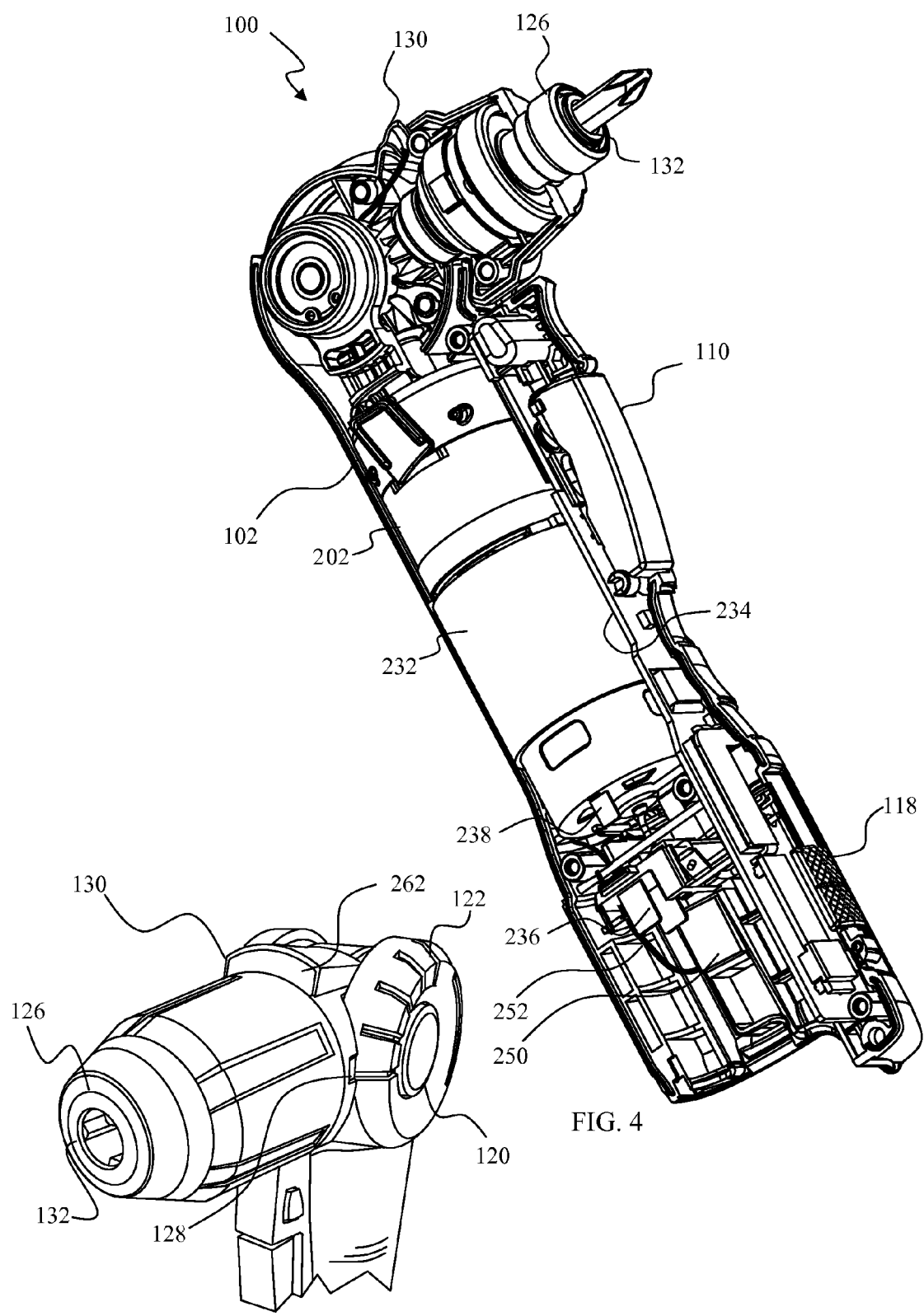
FIG. 3 depicts a partial front perspective view of the articulating drill of FIG. 1 showing a shaped beam pattern light emitter.
FIG. 4 depicts a perspective view of the articulating drill of FIG. 1 with the battery pack, a portion of the main housing cover, and a portion of the head housing removed and a bit in the bit holder.

An articulating drill generally designated 100 is shown in FIG. 1. In the embodiment of FIG. 1, the drill 100 includes a main housing portion 102 and a head portion 104. The main housing portion 102 houses a motor and associated electronics for control of the drill 100. The main housing portion 102 includes a battery receptacle for receiving a rechargeable battery pack 106 as is known in the art. In one embodiment, the rechargeable battery pack 106 comprises a lithium-ion battery. The battery pack 106 is removed by depression of the battery release tabs 108. The drill 100 may alternatively be powered by an external power source such as an external battery or a power cord.

A variable speed trigger switch 110 controls the speed at which the motor rotates. The direction of rotation of the motor is controlled by a reversing button 112 which slides within a finger platform 114. Ventilation openings 116 allow for cooling air to be circulated around the motor inside of the main housing 102. A clutch control 118 sets the maximum torque that may be generated when using the drill 100.

The main housing portion 102 also includes an articulation button 120 and a plurality of angle reference indicators 122 molded onto the outer surface 124 of the main housing 102. In the embodiment of FIG. 1, there are five angle reference indicators 122 used to identify five angular positions in which the head portion 104 may be placed.

The head portion 104 includes a collet locking device 126, an angle indicator 128, and a lighting structure 130 as shown in FIG. 3. The angle at which the head portion 104 is positioned is indicated by the angle reference indicator 122 with which the angle indicator 128 is aligned. As shown in FIG. 1, the head portion 104 is at a 90 degree angle with respect to the main housing portion 102. In FIG. 2, the head portion 104 is axially aligned with the main housing portion 102. Although the embodiment of FIGS. 1 and 2 has five angle reference indicators 122, there may be additional or fewer angle reference indicators 122 and corresponding angles at which the head portion 104 may be placed with respect to the main housing portion 102.

Figure 5:
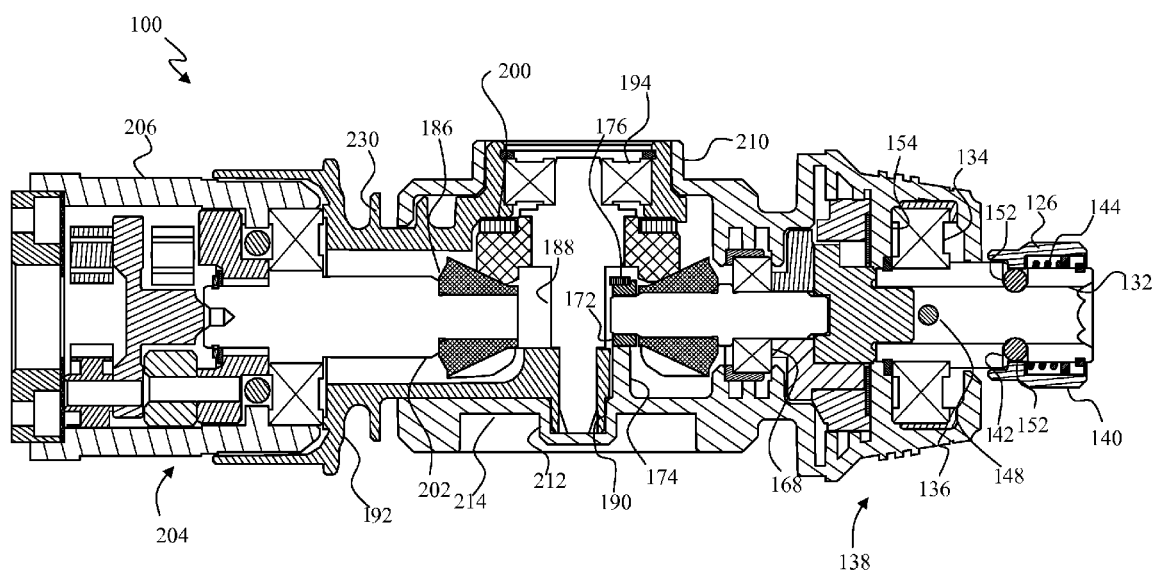
FIG. 5 depicts a cross-sectional view of the head portion, the articulating gear system and the planetary gear system of the articulating drill of FIG. 1.
Figure 6:
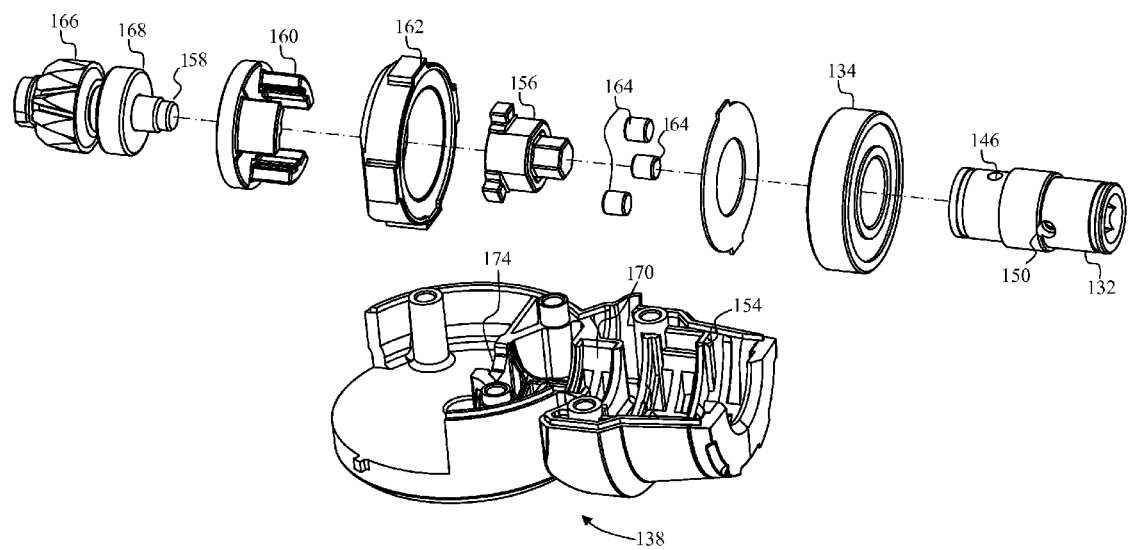
FIG. 6 depicts an exploded perspective view of the head portion, including an automatic spindle lock system, of the articulating drill of FIG. 1.

Referring now to FIGS. 4-6, the collet locking device 126 is located around a bit holder 132 which is in turn supported by a ball bearing 134 that is fixed within a bearing pocket 136 of the head housing 138. The collet locking device 126 includes a sleeve 140 with recesses 142. A spring 144 is positioned about the bit holder 132. The bit holder 132 includes a hole 146 which receives a cylinder pin 148 and recesses 150 which receive steel balls 152.

The bearing 134 abuts the head housing 138 of the head portion 104 at the outer rear periphery of the bearing 134. More specifically, the bearing 134 abuts a flange 154. In this embodiment, the flange 154 is continuous about the housing 138, although a flange may alternatively be in the form of a plurality of fins located about the inner portion of the housing 138.

The bit holder 132 is operably coupled to a drive collet 156 which is in turn connected to an output pinion shaft 158 through a drive plate 160 which is fixedly attached to the output pinion shaft 158. A lock ring 162 surrounds the drive collet 156 and three locking pins 164. The lock ring 162, the drive collet 156, the drive plate 160, and the locking pins 164 all comprise an automatic spindle lock system such that the output bit holder 132 can only be driven from the pinion side as known in the art. When driven from the bit side, i.e., when the tool 100 is used as a manual screwdriver, the spindle lock system keeps the output pinion shaft 158 from rotating thus facilitating use of the tool 100 as a manual screwdriver. In an alternative embodiment, a manually manipulated locking device may be used.

Figure 7:
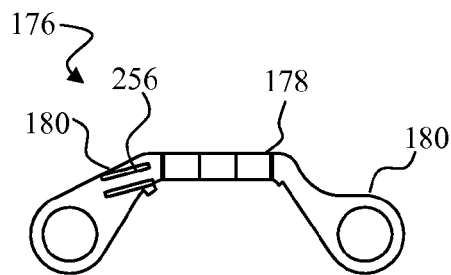
FIG. 7 depicts a top plan view of a bracket used to support an output pinion shaft in the articulating drill of FIG. 1.
Figure 8:
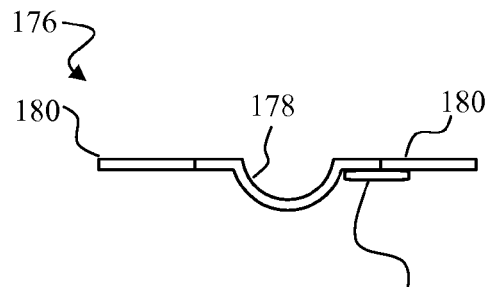
FIG. 8 depicts a side plan view of the bracket of FIG. 7.

A pinion gear 166 is located at the opposite end of the output pinion shaft 158 from the drive plate 160. One end of the output pinion shaft 158 is maintained in axial alignment by a bearing 168 which fits within a bearing pocket 170. The opposite end of the output pinion shaft 158 is supported by a sleeve 172. The sleeve 172 is supported on one side by a flange 174 on the head housing 138. On the opposite side, the sleeve 172 is supported by a bracket 176 also shown in FIGS. 7 and 8.

Figure 9:
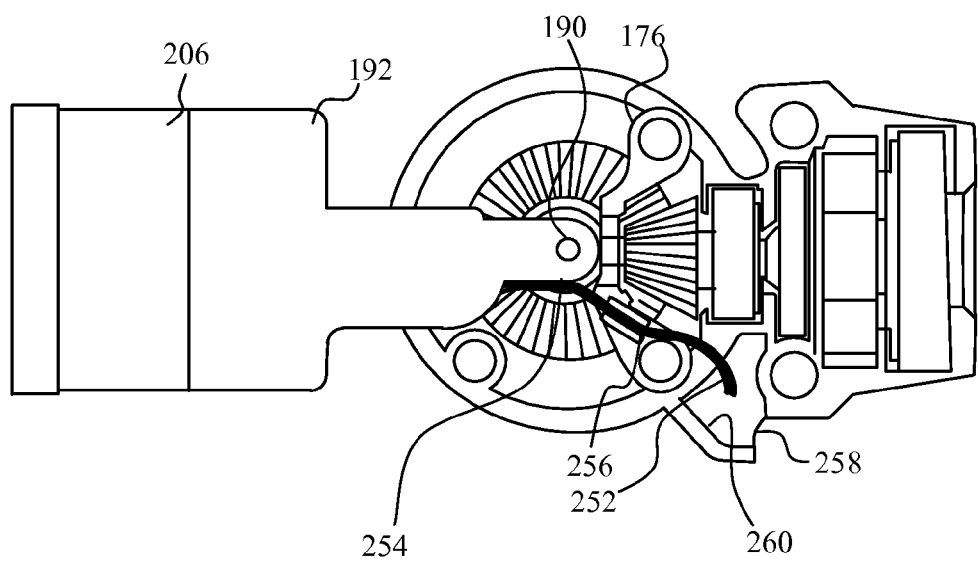
FIG. 9 depicts a top elevational view of the planetary gear section, articulating section and head portion of the articulating drill of FIG. 1 with the main housing and a portion of the head housing removed.

The bracket 176 includes a support area 178 configured complimentary to a portion of the sleeve 172. Two connection arms 180 are configured to be attached to the head housing 138 as shown in FIG. 9. The bracket 176 eliminates the need to provide a matching flange for flange 174 molded into the opposite side of the head housing 138. The elimination of the need for an opposing flange allows for a significant increase in design freedom as the space requirements for the support structure for the sleeve 172 are reduced. The bracket 176 may be stamped from W108 steel to provide the needed rigidity and strength.

Figure 10:
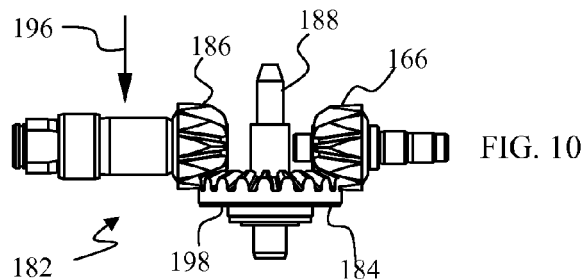
FIG. 10 depicts a side elevational view of the articulating gear system of the articulating drill of FIG. 1 including a bevel gear and two pinion gears.

Referring now to FIG. 10, the pinion gear 166 forms a portion of an articulating gear system 182. The articulating gear system 182 further includes a bevel gear 184 which is engaged at the output portion of the articulating gear system 182 with the pinion gear 166 and further engaged on the motor portion by pinion gear 186. The shaft 188 of the bevel gear 184 is supported at one end within a hole 190 (see FIG. 9) of the frame 192. The frame 192 is made from a zinc and aluminum alloy ZA-8. This material provides a sufficiently low coefficient of friction to ensure relatively small frictional forces exist between the shaft 188 and the frame 192.

The shaft 188 is radially and axially supported at the opposite end by a ball bearing 194 supported by the frame 192. At this end of the shaft 188, however, comparatively larger forces are generated than at the end of the shaft 188 inserted within the hole 190. More specifically, as shown in FIG. 10, both pinion gear 166 and pinion gear 186 are located on the same side of the bevel gear 184. Accordingly, as the articulating gear system 182 rotates, a force is generated on the bevel gear 184 in the direction of the arrow 196 toward the base 198 of the bevel gear 184. This force acts to disengage the bevel gear 184 from the pinion gear 166 and the pinion gear 186. With this increased force acting upon the bevel gear 184, an unacceptable amount of axial force would be transmitted to the bearing 194. Accordingly, a thrust bearing 200 is provided to protect the ball bearing 194 and to provide a low friction support for the base 198 of the bevel gear 184. The thrust bearing 200 is made of a material with an acceptably low coefficient of friction such as oil impregnated bronze commercially available from McMaster Carr of Chicago, Ill. Accordingly, the friction generated at the base 198 of the bevel gear 184 is maintained within acceptable levels.

Referring again to FIG. 5, the pinion gear 186 is fixedly attached to a planetary gearbox shaft 202 which receives torque from a planetary gear system generally indicated as reference numeral 204. The planetary gear system 204 receives torque from a motor as is known in the art. The planetary gear system 204 is located within a planetary gear housing 206 which is inserted partially within the frame 192. This arrangement allows for the planetary gear system 204 to be separately manufactured from the other components while simplifying assembly of the planetary gear system 204 with the other components. This modularity further allows for alternative gearings to be provided in the planetary gear system 204 while ensuring a proper fit with the other components.

Figure 11:
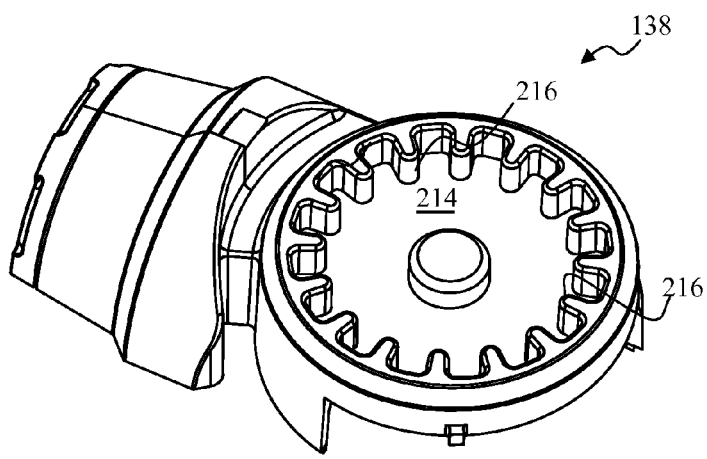
FIG. 11 depicts a perspective view of a portion of the head housing of the drill of FIG. 1 with a plurality of teeth in a well which are formed complimentary to teeth on the articulation button.

Continuing with FIG. 5, the frame 192 is configured to slidingly mate with the head housing 138. To this end, the head housing 138 includes a shroud portion 210 which is complimentarily formed to the frame 192 about the ball bearing 194. The head housing 138 further includes a recess 212 which is configured to receive the portion of the frame 192 which defines the hole 190. Also shown in FIG. 5 is a well 214 which includes a plurality of teeth 216 shown in FIG. 11.

Figure 12:
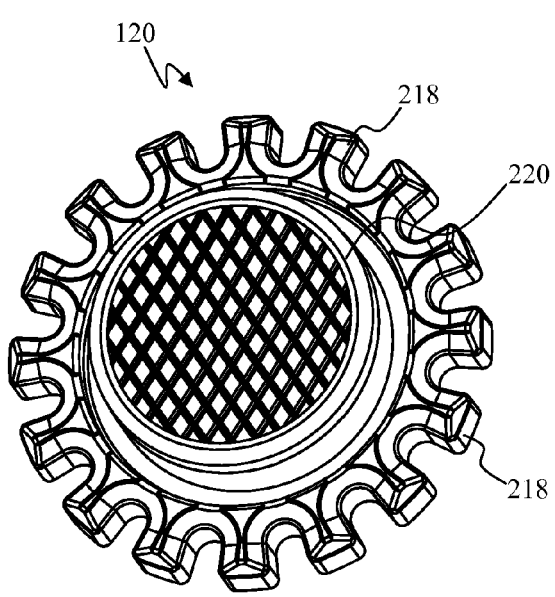
FIG. 12 depicts a perspective view of the articulating button of the articulating drill of FIG. 1.
Figure 13:
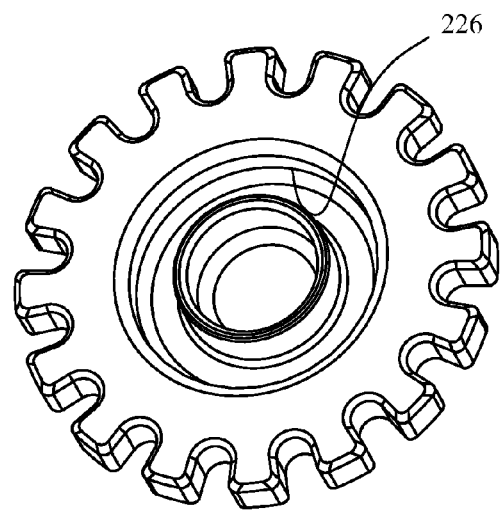
FIG. 13 depicts a perspective view of the bottom of the articulating button of FIG. 12.
Figure 14:
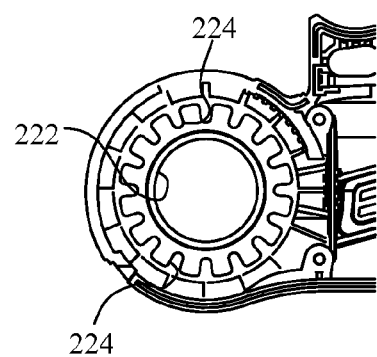
FIG. 14 depicts a partial top elevational view of the inner surface of the outer housing of the articulating drill of FIG. 1 with teeth formed complimentary to the teeth on the articulation button and a hole for receiving a raised portion of the articulating button.

With further reference to FIGS. 12-14, the well teeth 216 are formed complimentary to a plurality of teeth 218 which are formed in the articulation button 120. The articulation button 120 includes a raised center portion 220 which is configured to fit within a hole 222 in the main housing portion 102. The teeth 218 of the articulation button 120 are further configured to mesh with a plurality of teeth 224 formed on the inner side of the main housing portion 102 around the hole 222. The articulation button 120 also includes a spring receiving well 226 on the side of the articulation button 120 facing the well 214. When assembled, a spring (not shown) is located within the well 214 and extends into the spring receiving well 226 forcing the raised center portion 220 of the articulation button 120 toward a position wherein the articulation button 120 projects into the hole 222.

Figure 15:
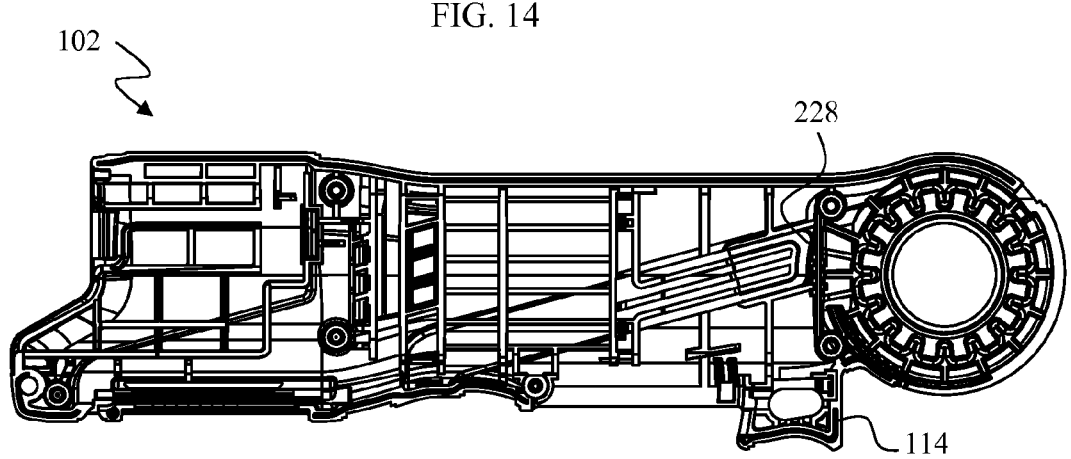
FIG. 15 depicts a top elevational view of the inner surface of the outer housing of the articulating drill of FIG. 1.

Referring to FIGS. 5 and 15, the frame 192 is supported axially in the main housing portion 102, which in this embodiment is made of plastic, by a rib 228. The rib 228 lies beneath a fin 230 of the frame 192 when the frame 192 is installed in the main housing portion 102 as shown in FIG. 4. The planetary gear system 204 is mechanically secured to a motor 232 which is itself electrically connected to a printed circuit board 234 which in turn is electrically connected to a battery contact holder 236. The contact holder 236 mates with battery pack receptacles on the battery pack 106 and transmits battery power to the electronic circuit board 234 through lead wires (not shown). Another pair of lead wires (not shown) extends from the circuit board 234 to the motor terminals 238 to deliver the required voltage level to the motor 232.

The circuit board 234 is further connected to a light source 250 which in one embodiment is positioned in the main housing 102 as shown in FIG. 4. The light source 250 may be a light emitting diode (LED), a group of LEDs, or other source of light. Positioning the light source 250 within the main housing 102 allows for removal of heat generated by the light source 250 using the ventilation openings 116. A flexible light pipe 252 is connected to the light source 250 and extends along the main housing 102 to a location adjacent the hole 190 in the frame 192 as shown in FIG. 9. An anchor clip 254 on the frame 192 ensures the light pipe 252 does not come into contact with the articulating gear system 182 or the articulation button 120 during operation of the drill 100. The light pipe 252 is further secured to the bracket 176 with an anchor clip 256 and extends into a lighting well 258 in the head housing 138. A reflective portion 260 of the head housing 138 functions as a reflector. In one embodiment, a separately formed reflector is provided within the lighting well 258. The lighting well 258 is enclosed by a lens 262 as shown in FIG. 3.

Operation of the articulating drill 100 is similar to the operation of the articulating drill disclosed in U.S. application Ser. No. 11/593,187, filed on Nov. 3, 2006, the entire contents of which are herein incorporated by reference. Manipulation of the variable speed trigger 110, in addition to controlling the speed at which the motor 232 rotates, further causes power to be applied to the light source 250 which transmits light into the light pipe 252.

The light pipe 252 conducts substantially all of the incoming light from the light source 250 to the lighting well 258. The light pipe 252, in addition to transmitting light, is in this embodiment flexible. Accordingly, as the head housing 138 is articulated, the light pipe 252 bends between the anchor clips 254 and 256 (see FIG. 9). U.S. Pat. No. 5,485,541, which issued on Jan. 16, 1996, discloses a light pipe with acceptable flexibility for use as a light pipe 252.

Once light has been transmitted along the light pipe 252 and into the lighting well 258, the light is emitted from the light pipe 252. The light then reflects off of the reflective portion 260 of the head housing 138 and out of the lens 262. The reflective portion 260 and the lens 262 shape the incoming light into a desired beam pattern. Because the light source 250 is located remotely from the head housing 138, the head housing 138 remains cool.

Figure 16:
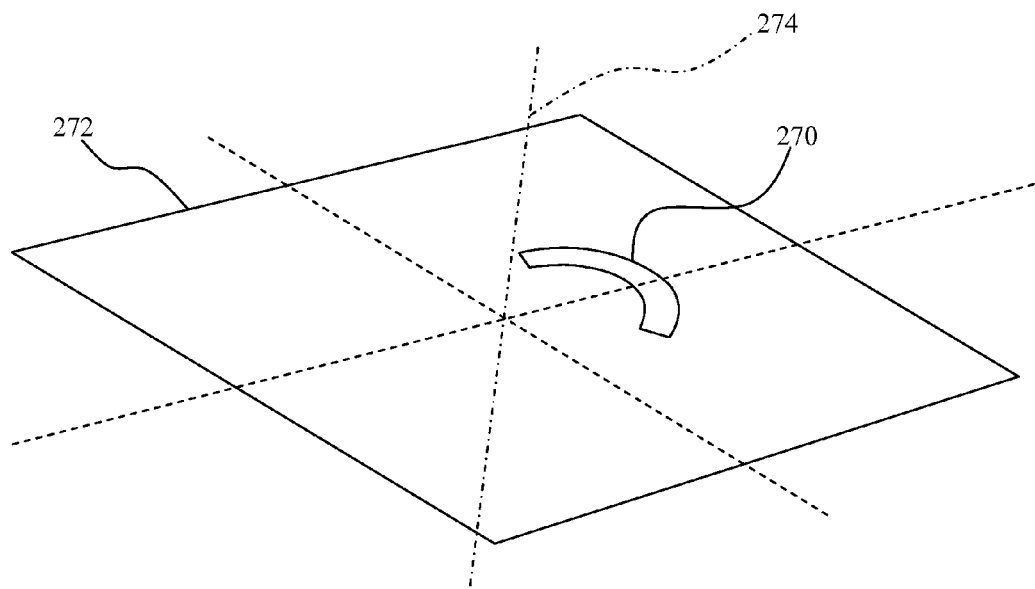
FIG. 16 depicts a perspective schematic view of a beam pattern plane with an elongated partial toric section beam pattern.
Figure 17:
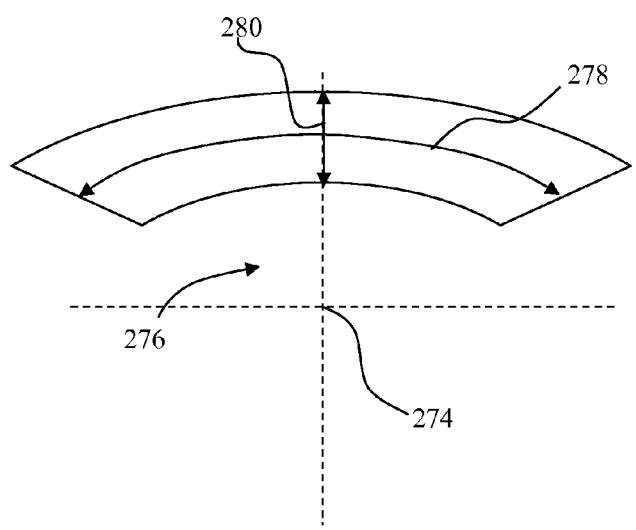
FIG. 17 depicts a plan view of the beam pattern plane and beam pattern of FIG. 16.

The beam pattern 270 formed by the reflective portion 260 and the lens 262 is illustrated in FIG. 16. The beam pattern 270 is described with reference to a beam pattern plane 272. A "beam pattern plane", as that term is used herein, is defined to be a plane that is perpendicular to the axis of rotation and positioned such that a beam projected onto the plane forms a pattern that is spaced apart from the location at which the axis of rotation intersects the plane. Thus, the plane 272 is located close to the lens 262 such that a gap 276 exists between the axis of rotation 274 and the beam pattern 270 as depicted in FIG. 17. If desired, the beam pattern 270 may be formed such that the pattern 270 further intersects the axis of rotation 274 in a second plane located at a distance from the bit holder 132 at which a work piece would be positioned when using the drill 100 to shape the work piece.

The beam pattern 270 is an elongated beam pattern. An "elongated beam pattern" as that term is used herein is a beam pattern which, when viewed on a beam pattern plane, extends about the axis of rotation for a distance that is greater than the depth of the beam pattern. The "depth" of the beam pattern may generally be measured along a line through the center of the beam pattern, as formed on the beam pattern plane, that intersects the axis of rotation. Thus, the beam pattern 270 has a beam pattern length 278 that is greater than the beam pattern depth 280.

Figure 18:
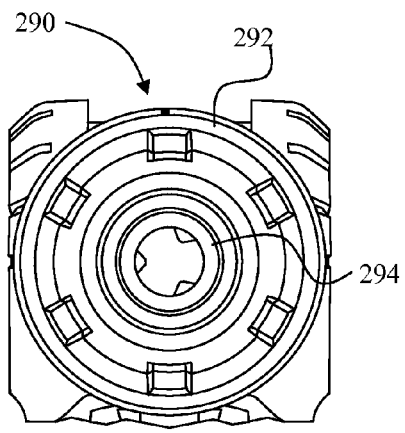
FIG. 18 depicts a partial front plan view of a head portion of an articulating drill with a lighting assembly that generates an elongated beam pattern formed in a substantially complete toric section on a beam pattern plane.
Figure 19:
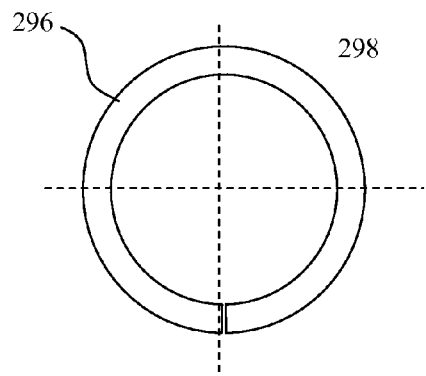
FIG. 19 depicts a plan view of a beam pattern plane with a beam pattern formed in a substantially complete toric section by the lighting assembly of FIG. 18.

The beam pattern 270 is also an arcuate beam pattern. An "arcuate" beam pattern is a beam pattern which is curved as opposed to rectangular as viewed on the beam pattern plane 272. That is, the shape of the beam pattern resembles at least a portion of a toric section. If desired, the length of the beam pattern may be extended to obtain a substantially complete toric section. By way of example, FIG. 18 depicts a head housing 290 that includes a lighting structure 292 that extends substantially completely around a bit holder 294. The lighting structure 292 may be formed, for example, by a waveguide. One type of waveguide which may be used is disclosed in U.S. Pat. No. 6,550,952, which issued on Apr. 22, 2003. As depicted in FIG. 19, the lighting structure 292 generates a beam pattern 296 on a beam pattern plane 298 that is substantially a toric section.

Figure 20:
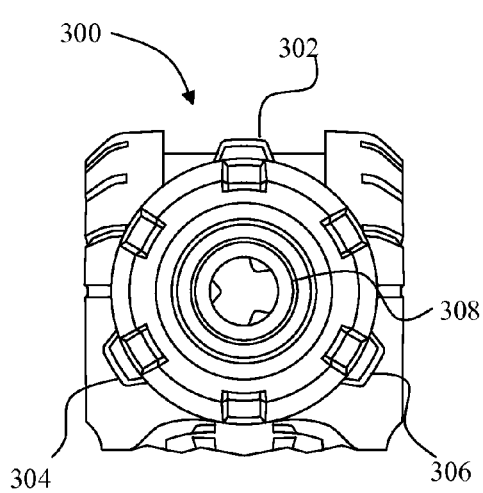
FIG. 20 depicts a partial front plan view of a head portion of an articulating drill with a lighting assembly including three lighting structures that generate an elongated beam pattern including three toric section portions on a beam pattern plane.
Figure 21:
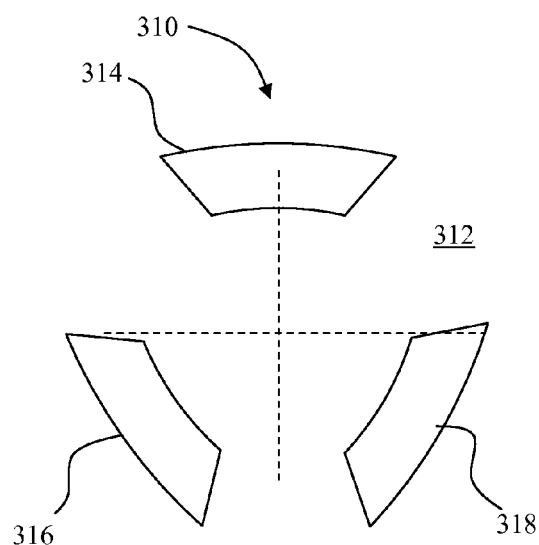
FIG. 21 depicts a plan view of a beam pattern plane with a beam pattern including three toric section portions generated by the lighting assembly of FIG. 18.

If desired, a plurality of elongated beam patterns may be used to provide lighting for an articulating tool. By way of example, FIG. 20 depicts a head housing 300 that includes a lighting structure 302, a lighting structure 304, and a lighting structure 306 that are positioned equidistantly about a bit holder 308. The lighting structures 302, 304, and 306 generate a beam pattern 310 on a beam pattern plane 312 (see FIG. 21) that includes arcuate beam pattern sections 314, 316, and 318. The beam pattern sections 314, 316, and 318 are each portions of a toric section.

Moreover, while the light source 250, the light pipe 252, the reflective portion 260, and the lens 262 form a lighting assembly in the embodiment of FIG. 1, other lighting assemblies incorporating more or fewer components may be used to form elongated patterns. By way of example, a light assembly may include only a light source and a lens configured to form an elongated pattern.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. An articulating hand power tool comprising:
   a head portion including a head housing configured to articulate with a main housing;
   a bit holder rotatably positioned within the head housing and defining an axis of rotation; and
   a lighting assembly configured to emit a first elongated beam pattern from the head portion, wherein the first elongated beam pattern when projected onto a beam pattern plane defines at least a portion of a toric section.

2. The power tool of claim 1, wherein the lighting assembly is further configured to emit a second elongated beam pattern from the head portion.

3. The power tool of claim 1, wherein the first elongated beam pattern forms a substantially complete toric section about the axis of rotation defined by the bit holder on the beam pattern plane.

4. The power tool of claim 1, wherein the head housing defines a first lighting structure, the first lighting structure housing at least a portion of the first lighting assembly.

5. The power tool of claim 4, wherein the lighting assembly comprises a reflector housed within the lighting structure.

6. The power tool of claim 1, wherein the lighting assembly comprises:
   a light source positioned within the main housing; and
   a light pipe extending from the main housing into the head housing.

7. An articulating hand power tool comprising:
   a main housing;
   a head portion configured to articulate with a main housing;
   a bit holder rotatably supported within the head portion and defining an axis of rotation;
   a first lighting structure positioned on the head portion; and
   a lighting assembly configured to emit an elongated beam pattern from the first lighting structure, wherein the elongated beam pattern when projected onto a beam pattern plane defines at least a portion of a toric section.

8. The power tool of claim 7, further comprising:
   a second lighting structure, wherein the lighting assembly is further configured to emit an elongated beam pattern from the second lighting structure.

9. The power tool of claim 7, wherein the elongated beam pattern defines a substantially complete toric section about the axis of rotation when projected on the beam pattern plane.

10. The power tool of claim 7, wherein:
    the first lighting structure comprises a lighting well;
    the head portion comprises a head housing;
    the head housing defines the lighting well; and
    at least a portion of the lighting assembly is housed within the lighting well.

11. The power tool of claim 10, wherein the lighting assembly comprises:
    a light source positioned within the main housing; and
    a light pipe extending from the main housing into the lighting well.

12. The power tool of claim 10, wherein the lighting assembly comprises a reflector housed within the lighting well.

13. The power tool of claim 7, wherein the lighting assembly comprises:
    a light source positioned within the main housing; and
    a light pipe extending from the main housing into the head portion.

14. The power tool of claim 13, wherein the light pipe is a flexible light pipe configured to operably bend at least ninety degrees.

15. A hand power tool comprising:
    a housing;
    a bit holder rotatably positioned within the housing and defining an axis of rotation; and
    a lighting assembly configured to emit a first beam pattern, wherein the first beam pattern defines at least a portion of a toric section when projected on a beam pattern plane.

16. The power tool of claim 15, wherein the lighting assembly is further configured to emit a second beam pattern.

17. The power tool of claim 15, wherein the first beam pattern defines a substantially complete toric section about the axis of rotation when projected on the beam pattern plane.

18. The power tool of claim 16 wherein the second beam pattern defines at least a portion of a toric section when projected on the beam pattern plane.

19. The power tool of claim 18, wherein the lighting assembly is further configured to emit a third beam pattern and the third beam pattern defines at least a portion of a toric section when projected on the beam pattern plane.

* * * * *